United States Patent
Esler et al.

(10) Patent No.: US 11,945,455 B2
(45) Date of Patent: *Apr. 2, 2024

(54) SYSTEM AND METHOD FOR DYNAMIC CUSTOMIZABLE VEHICLE CONFIGURATION

(71) Applicant: Ford Global Technologies, LLC, Dearborn, MI (US)

(72) Inventors: Craig Edward Esler, Plymouth, MI (US); Ehab Aleid, Dearborn, MI (US); Ahmed Awadi, Farmington Hills, MI (US); Matheus Bianchi Dambros, Cologne (DE); Helmuth Bosch, Leverkusen (DE); Thomas Richard Wroblewski, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,847

(22) Filed: Nov. 29, 2022

(65) Prior Publication Data

US 2023/0103356 A1 Apr. 6, 2023

Related U.S. Application Data

(63) Continuation of application No. 17/012,353, filed on Sep. 4, 2020, now Pat. No. 11,529,963.

(51) Int. Cl.
*B60W 50/10* (2012.01)
*B60R 16/023* (2006.01)
(Continued)

(52) U.S. Cl.
CPC ......... *B60W 50/10* (2013.01); *B60R 16/0231* (2013.01); *B60W 50/14* (2013.01);
(Continued)

(58) Field of Classification Search
None
See application file for complete search history.

(56) References Cited

U.S. PATENT DOCUMENTS

| 6,100,881 | A | 8/2000 | Hsu et al. |
| 2002/0062185 | A1 | 5/2002 | Runge |

(Continued)

OTHER PUBLICATIONS

Ford Motor Company. "How to Set up Memory Seats." YouTube, YouTube, Jan. 11, 2018, https://www.youtube.com/watch?v=Awwi6eW90Kk. (Year: 2018).

(Continued)

*Primary Examiner* — James J Lee
*Assistant Examiner* — Andrew Sang Kim
(74) *Attorney, Agent, or Firm* — BURR & FORMAN LLP; Lorne Forsythe

(57) ABSTRACT

A control system for a vehicle may include a plurality of vehicle subsystems associated with respective different dynamic vehicle control functions and a plurality of subsystem controllers associated with respective ones of the vehicle subsystems. The subsystem controllers may be configured to control actuators associated with the respective different dynamic vehicle control functions to change an operational state of components of the vehicle subsystems based on respective configuration settings. The system further includes an attribute configuration module operably coupled to the subsystem controllers. The attribute configuration module may include processing circuitry configured to save current configuration settings as a saved configuration responsive to a first actuation of a configuration mode actuator and, after an on/off cycle of the vehicle, instruct the subsystem controllers to implement the saved configuration responsive to a second actuation of the configuration mode actuator.

18 Claims, 4 Drawing Sheets

(51) Int. Cl.
    *B60W 50/00*     (2006.01)
    *B60W 50/14*     (2020.01)
    *G06F 13/36*     (2006.01)

(52) U.S. Cl.
    CPC ..... *G06F 13/36* (2013.01); *B60W 2050/0075* (2013.01); *B60W 2050/0083* (2013.01); *B60W 2050/146* (2013.01); *B60W 2540/215* (2020.02); *B60W 2556/10* (2020.02)

(56) References Cited

U.S. PATENT DOCUMENTS

| | | |
|---|---|---|
| 2003/0078709 A1 | 4/2003 | Yester |
| 2006/0015221 A1 | 1/2006 | Sarkar |
| 2009/0089065 A1 | 4/2009 | Buck |
| 2009/0284359 A1 | 11/2009 | Huang |
| 2017/0088146 A1 | 3/2017 | Stahulak |
| 2019/0366846 A1 | 9/2019 | Cao et al. |
| 2021/0316754 A1* | 10/2021 | Bielby ................ B60W 10/18 |

OTHER PUBLICATIONS

Mopar. "Electronic Front Sway Bar Disconnect | How to | 2020 Jeep Wrangler.": YouTube, YouTube, Sep. 26, 2019, https://www.youtube.com/watch?v=KmYKmkLLczg. (Year: 2019).

Ford, 2020 F-150 Owner's Manual, Apr. 2020, Lithio in U.S.A., Third Printing (Year: 2020).

Ford, 2019 Mustang Owner's Manual, Jan. 2019, Lithio in U.S.A., Second Printing (Year: 2019).

\* cited by examiner

SYSTEM AND METHOD FOR DYNAMIC CUSTOMIZABLE VEHICLE CONFIGURATION

CROSS REFERENCE TO RELATED APPLICATIONS

This application is a Continuation application of U.S. application Ser. No. 17/012,353 filed Sep. 4, 2020, the entire contents of which is incorporated by reference herein.

TECHNICAL FIELD

Example embodiments generally relate to vehicle control technology and, more particularly, relate to a system and method for enabling customization of dynamic features of the vehicle.

BACKGROUND

Vehicles today can span a wide spectrum in terms of the features they employ. From base models that may have very few features to high end packages that are loaded with features, the inclusion of features and the ability to control them can be important sales drivers for vehicle manufacturers. Operators in the market for vehicles loaded with features may be attracted to the ability to store certain settings for such features in association with a user profile. Thus, for example, the user may, with a simple button push, convert settings associated with another vehicle driver to their own personalized settings.

The personalization and storage of setting described above, while familiar to many, is limited in scope. In this regard, the settings that are able to be saved in this context are almost exclusively settings associated with comfort or other non-dynamic functions, and therefore exclude functions associated with vehicle control. For example, the settings may include mirror position, seat position and other features associated with the seat, radio settings, cabin climate settings, etc. These settings typically do not relate to vehicle control functions much less dynamic vehicle control functions that can be modified during operation.

Thus, it may be desirable to extend the capability of operators to customize vehicle settings to provide a more satisfying user experience.

BRIEF SUMMARY OF SOME EXAMPLES

In accordance with an example embodiment, a vehicle control system for a vehicle may be provided. The system may include a plurality of vehicle subsystems associated with respective different dynamic vehicle control functions and a plurality of subsystem controllers associated with respective ones of the vehicle subsystems. The subsystem controllers may be configured to control actuators associated with the respective different dynamic vehicle control functions to change an operational state of components of the vehicle subsystems based on respective configuration settings. The system further includes an attribute configuration module operably coupled to the subsystem controllers. The attribute configuration module may include processing circuitry configured to save current configuration settings as a saved configuration responsive to a first actuation of a configuration mode actuator and, after an on/off cycle of the vehicle, instruct the subsystem controllers to implement the saved configuration responsive to a second actuation of the configuration mode actuator.

In another example embodiment, an attribute configuration module of a vehicle control system may be provided. The attribute configuration module may include processing circuitry configured to communicate with a plurality of vehicle subsystems associated with respective different dynamic vehicle control functions, and a plurality of subsystem controllers associated with respective ones of the vehicle subsystems. The subsystem controllers may be configured to control actuators associated with the respective different dynamic vehicle control functions to change an operational state of components of the vehicle subsystems based on respective configuration settings. The processing circuitry may be further configured to save current configuration settings as a saved configuration responsive to a first actuation of a configuration mode actuator and, after an on/off cycle of the vehicle, instruct the subsystem controllers to implement the saved configuration responsive to a second actuation of the configuration mode actuator.

In another example embodiment, a method of providing customizable vehicle attribute configuration is provided. The method may include monitoring a vehicle communication bus via which a plurality of vehicle subsystems associated with respective different dynamic vehicle control functions communicate with a plurality of subsystem controllers associated with respective ones of the vehicle subsystems. The subsystem controllers may be configured to control actuators associated with the respective different dynamic vehicle control functions to change an operational state of components of the vehicle subsystems based on respective configuration settings. The method may further include, in response to a first form of actuation of a configuration mode actuator, storing current configuration settings as a saved configuration based on encoded signals on the vehicle communication bus that device the respective configuration settings, and, in response to a second form of actuation of the configuration mode actuator, after an on/off cycle of the vehicle, instructing the subsystem controllers to implement the saved configuration via mirror signals that use the same coding as the encoded signals.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
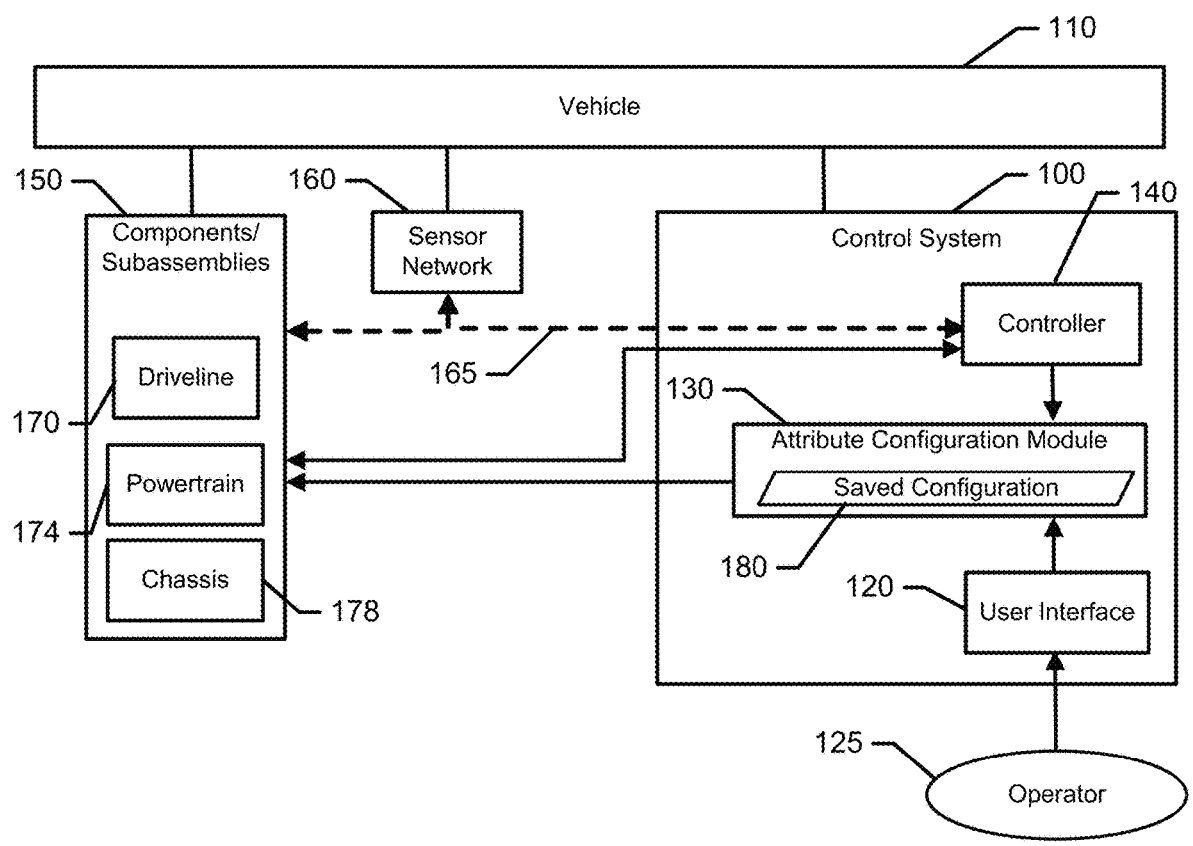
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, the creation and storage of profile settings is generally exclusive of vehicle control functions, and this is particularly true of dynamic vehicle control functions. In this regard, within this disclosure the term vehicle control function should be understood to relate to a function or feature that relates to powertrain features, driveline features and/or chassis features that impact various components associated with operation of the vehicle. Furthermore, vehicle control functions are considered dynamic if they are related to vehicle control functions that can be changed by the operator "on the fly" or during vehicle motion/operation.

For current vehicles, each time the vehicle is started (i.e., for each key cycle or on/off cycle) the vehicle will be returned to base settings for all dynamic vehicle control functions. To the extent vehicle control functions are changeable by the operator, the operator would typically be required to change each one from the base settings after every key cycle. Moreover, many vehicles do not allow changing of settings for dynamic vehicle control functions, but instead require the vehicle to be in park or stationary prior to allowing settings for certain vehicle control functions to be changed. This generally means that each time the operator starts the vehicle, he/she will have to navigate through multiple button or switch presses in order to change the settings of vehicle control functions.

Example embodiments may provide a system that is not only capable of providing the operator with an ability to quickly save a current vehicle setup to include dynamic vehicle control functions, but further enables the ability to quickly retrieve the saved vehicle setup and initiate the settings associated with the dynamic vehicle control functions on the fly. In some cases, a single button/switch may be actuated (e.g., with a characteristic actuation trigger) to handle both saving current settings and retrieving saved settings. Moreover, in some cases, the same single button/switch could also be used to display current saved settings to enable the operator to make adjustments from an informed position. As such, some example embodiments may provide an improved system for vehicle control that can yield benefits in both customer confidence and vehicle capability. As a result, vehicle performance and driver satisfaction may also be improved.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the elements of FIG. 1 may be operably coupled to the vehicle 110, it should be appreciated that such connection may be either direct or indirect. Moreover, some of the elements of the control system 100 may be connected to the vehicle 110 via intermediate connections to other elements either of the chassis or of other electronic and/or mechanical systems or components.

The control system 100 may include one or more instances of subsystems that are dedicated to various aspects of vehicle operation, control, etc. Some of all of these various subsystems may be controlled via a user interface 120 by an operator 125. The operator 125 may therefore utilize the user interface 120 to select any of various selectable other modes of operation, and/or interact with the subsystems mentioned above in order to alter various settings associated with the respective subsystems. The user interface 120 may be embodied by an interactive display in the vehicle 110, and may further include one or more function buttons, switches and/or the like, which may be disposed in any or all of the dashboard, console, steering wheel, door, or any other part of the vehicle 110. The display may provide one or more instances of a soft switch for actuation of various corresponding functions. However, in other examples, the user interface 120 may include only hard switches, buttons, keys, or other selectable operators located in the cockpit of the vehicle 110. Combinations of hard and soft switches are also possible.

The control system 100 of example embodiments may also include an attribute configuration module 130, which may include, be part of or otherwise be operably coupled to a controller 140. The attribute configuration module 130 may be configured to enable the customization of dynamic vehicle control functions as described herein based on inputs from any or all of the controller 140, the user interface 120 or other components of the vehicle 110. In some cases, the controller 140 may be part of an electronic control system of the vehicle 110 that is configured to perform other tasks related or not related to subsystem management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, various components associated with a driveline 170, powertrain 174, and/or chassis 178 of the vehicle 110. Thus, the components or subassemblies 150 may include various components or subsystems such as, for example, a steering assembly, a brake assembly, a propulsion system, a wheel assembly, exhaust assembly, suspension assembly, fuel assembly, front/rear differential, etc., of the vehicle 110.

The controller 140 and/or attribute configuration module 130 may be configured to receive inputs from the operator 125 via the user interface 120 defining settings for subsystems or components of any or all of the driveline 170, powertrain 174, and chassis 178. In some examples, settings associated with various functions that are configurable in association with the driveline 170, powertrain 174, and chassis 178 may be changed by corresponding operation of switches (hard or soft switches) operably coupled to the vehicle communication bus 165. Signals associated with the respective settings may have unique encodings that identify the respective components and settings defined for each switch position. As the operator 125 makes adjustments to any or all of the switch positions, the signals are updated accordingly and communicated over the vehicle communication bus 165 to respective actuators of the components/systems that are to be modified in accordance with the settings. These signals on the vehicle communication bus 165 can be detected by the attribute configuration module 130 to determine the current settings. As will be discussed in greater detail below, the attribute configuration module 130 may be configured to save the current settings (as a saved configuration 180) for the entire suite of dynamic vehicle control functions at any time with a simple actuation trigger. The attribute configuration module 130 may also be configured to, at any time thereafter, retrieve the saved configuration 180 and direct institution of the saved configuration 180. The retrieval may also be accomplished with a simple actuation trigger (sometimes of the same actuator). However, notably, some example embodiments may not alter the state of the switches (or even the signals generated based on their respective states) when implementing the saved configuration 180.

Figure 2:
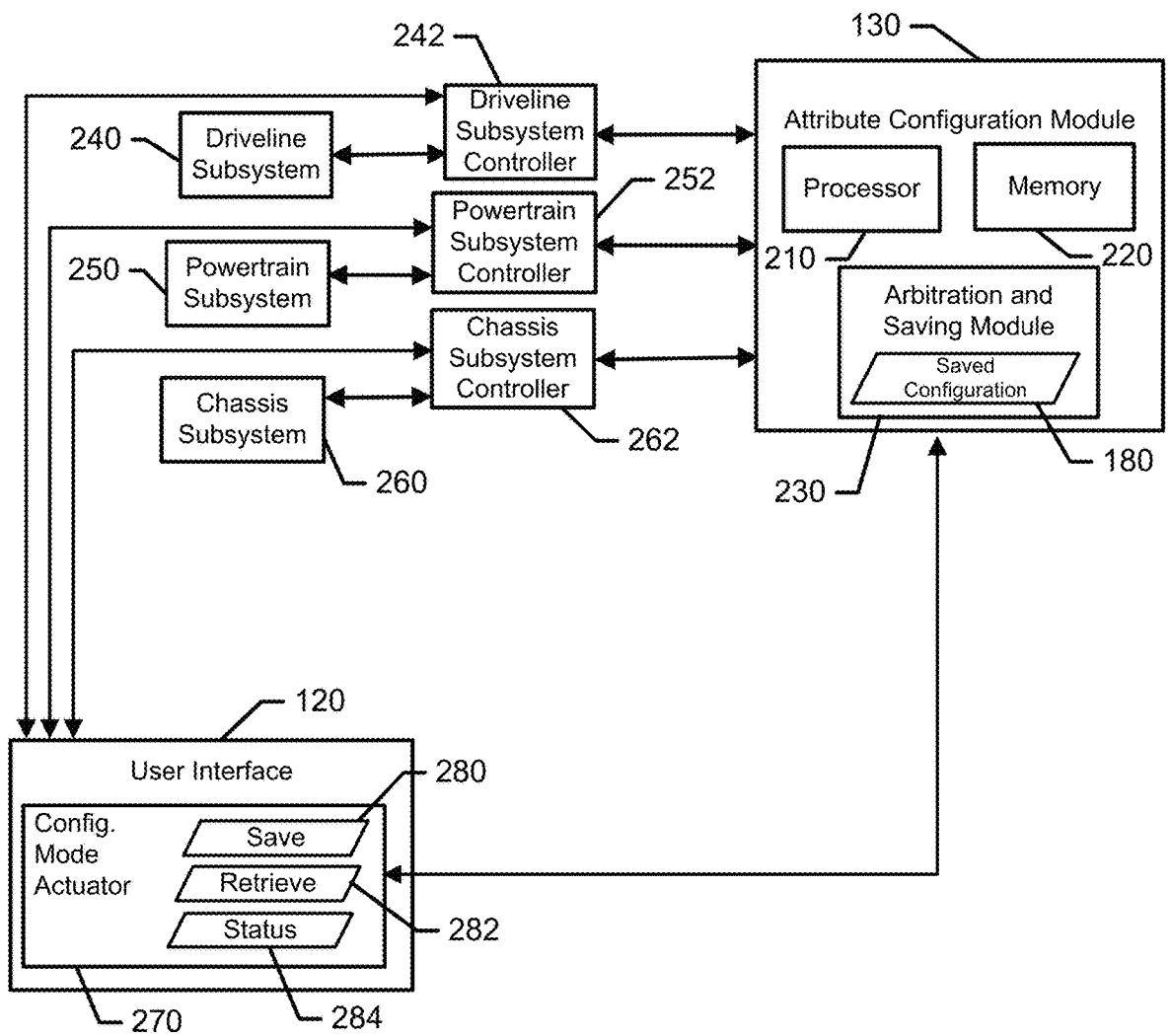
FIG. 2 illustrates a block diagram of some components of the vehicle control system of FIG. 1 in accordance with an example embodiment.

Operation of the attribute configuration module 130 will be described in greater detail below in reference to FIG. 2. FIG. 2 illustrates a block diagram of various components of the control system 100 in greater detail. In this regard, for example, FIG. 2 illustrates example interactions between the attribute configuration module 130 and various subsystems associated with the driveline 170, powertrain 174, and chassis 178 of FIG. 1. Processing circuitry (e.g., a processor 210 and memory 220) at the attribute configuration module 130 (or controller 140) may process the information received by running one or more control algorithms and/or control modules. The control algorithms/modules may include instructions that can be stored by the memory 220 for retrieval and execution by the processor 210. Thus, the processing circuitry should be understood to be capable of being embodied as a circuit chip (e.g., an integrated circuit chip) or other functional entity configured (e.g., with hardware, software executed on hardware, or a combination of hardware and software) to perform operations described herein.

The processor 210 may be configured to execute the control algorithms/modules in series or in parallel. However, in an example embodiment, the processor 210 may be configured to execute multiple control algorithms/modules in parallel (e.g., simultaneously) and substantially in real time. The control algorithms/modules may therefore execute various functions based on the information or instructions received, and generate outputs to drive the activities of the attribute configuration module 130 as described herein. The attribute configuration module 130 may therefore itself be embodied as a control algorithm, or may include control algorithms in the form of functional modules (or submodules) configured to perform specific functions for which they are configured relating to handling various configuration settings the vehicle 110 in the manner described herein.

In an example embodiment, the attribute configuration module 130 may include an arbitration and saving module 230 (which may be embodied by the processor 210 and memory 220—or other instances thereof). The arbitration and saving module 230 may be configured to interface with the subsystems associated with the driveline 170, powertrain 174, and chassis 178 of FIG. 1 as mentioned above. Thus, for example, a driveline subsystem 240 may include components associated with various configurable aspects of the driveline 170. The attribute configuration module 130 (via the arbitration and saving module 230) may interface with the driveline subsystem 240 via a driveline subsystem controller 242 to manage saving and retrieval of configuration settings of the driveline subsystem 240 in accordance with an example embodiment. Similarly, a powertrain subsystem 250 may include components associated with various configurable aspects of the powertrain 174. The attribute configuration module 130 (via the arbitration and saving module 230) may interface with a powertrain subsystem controller 252 to manage saving and retrieval of configuration settings of the powertrain subsystem 250 in accordance with an example embodiment. A chassis subsystem 260 may include components associated with various configurable aspects of the chassis 178. The attribute configuration module 130 (via the arbitration and saving module 230) may interface with the chassis subsystem 260 via a chassis subsystem controller 262 to manage saving and retrieval of configuration settings of the chassis subsystem 260.

In an example embodiment, the driveline subsystem controller 242 also receives direct input from the operator 125 via the user interface 120 with regard to selection of various configuration settings for the driveline subsystem 240. The driveline subsystem controller 242 may be configured to interact with specific components and/or actuators of the driveline subsystem 240 to change physical component positions to match the configuration settings that are active. Some examples of configurable features associated with the driveline subsystem 240 may include transfer case setting (e.g., 4 wheel drive HI, 4 wheel drive LO, 2 wheel drive, etc.) and driveline mode (e.g., modes such as a sport mode, off road driving mode, etc.). Another example of configurable features associated with the driveline subsystem 240 may be an electronic locking differential. In this regard, for example, a front electronic differential lock (Front eLocker) status and/or a rear electronic differential lock (Rear eLocker) status may each be configurable via the driveline subsystem controller 242. Example embodiments enable changing settings for the Front or Rear eLocker, and corresponding electronic locking or unlocking of front and rear differentials on the fly and without stopping or placing the vehicle 110 in park.

Similarly, the powertrain subsystem controller 252 also receives direct input from the operator 125 via the user interface 120 with regard to selection of various configuration settings for the powertrain subsystem 250. The powertrain subsystem controller 252 may be configured to interact with specific components and/or actuators of the powertrain subsystem 250 to change physical component positions to match the configuration settings that are active. Some examples of configurable features associated with the powertrain subsystem 250 may include enabling/disabling the engine start/stop system, which may stop the engine when the vehicle 110 is stationary for at least a threshold amount of time, and automatically start the engine when the accelerator pedal is actuated. Another example includes the engine exhaust mode setting via which an exhaust valve may be actuated to divert exhaust to emit additional exhaust noise when desired. Another example may include the base powertrain mode, which may include various powertrain calibration packages. The calibration packages may have corresponding pedal mapping, shift schedules, or other controllable features that define modes such as a sport mode, Baja mode, etc.

Finally, the chassis subsystem controller 262 may also receive direct input from the operator 125 via the user interface 120 with regard to selection of various configuration settings for the chassis subsystem 260. The chassis subsystem controller 262 may be configured to interact with specific components and/or actuators of the chassis subsystem 260 to change physical component positions to match the configuration settings that are active. Some examples of configurable features associated with the chassis subsystem 260 may include the steering mode and the suspension mode. In this regard, each of the steering mode and the suspension mode may be adjustable to define different ranges of experiences. Steering mode may define a range of different steering efforts (soft to hard) that may be selectable, and suspension mode may employ physical changes to active suspension components to implement firmness changes in the suspension (e.g., from soft ride to hard ride) over a range of firmness options. Another configurable feature associated with the chassis subsystem 260 may be an automatic stabilizer bar disconnection and reconnection setting. The stabilizer bar may help with cornering at high speeds, but may generally be disconnected for off-road applications or at low speeds. The settings for the system may be controllable on the fly as part of the saved configuration 180. Additionally, a chassis system mode setting may also be adjustable via the chassis subsystem controller 262. The chassis system mode setting may define base driving modes for brake system calibration, stability control, traction control, off-road driving modes, and/or the like.

Many of the configurable features listed above in connection with the driveline subsystem 240, the powertrain subsystem 250, and the chassis subsystem 260 may normally only be changeable while the vehicle 110 operates and may be reset when there is a key cycle (i.e., an on/off cycle for the vehicle 110. Many are also normally not changeable on the fly in any case. However, the saved configuration 180 allows these configurable features to be easily accessed again by the operator 125 without significant effort and time. Moreover, the saved configuration 180 can be implemented on the fly or while the vehicle 110 is operating and/or in motion. Thus, the operator 125 may be enabled to tune the vehicle 110 in real time and experience each change before deciding what settings to ultimately settle on for the saved configuration 180.

In an example embodiment, the attribute configuration module 130 may be configured to receive input from a configuration mode actuator 270 of the user interface 120 to define various instructions for the operation of the attribute configuration module 130. In this regard, for example, the configuration mode actuator 270 may be a button or switch that is located on the steering wheel for easy access. However, the configuration mode actuator 270 may alternatively be at other locations, or could even be a soft switch on a display of the user interface 120. Regardless of the location (and the form factor), the configuration mode actuator 270 may be actuated by the operator 125 to issue various commands or instructions to the arbitration and saving module 230.

The command/instructions may include a save command 280, which directs the arbitration and saving module 230 to save a current configuration of all settings associated with the dynamic vehicle control functions as the saved configuration 180, and a retrieve command 282, which directs the arbitration and saving module 230 to retrieve the saved configuration 180 and instruct each of the subsystem controllers (i.e., driveline subsystem controller 242, powertrain subsystem controller 252 and chassis subsystem controller 262) to employ corresponding settings associated with the dynamic vehicle control functions that define the saved configuration 180. Although not required, in some cases, other commands may also be provided. For example, a status command 284 may be provided to recall the status of the saved configuration 180 (i.e., a listing of all current settings associated with the associated with the dynamic vehicle control functions that define the saved configuration 180) without initiating the settings. The operator 125 may then make modifications to individual ones of the settings, if desired. The operator 125 may then issue the save command 280 to save the modified settings as the saved configuration 180.

In an example embodiment, the configuration mode actuator 270 may be configured to have a different characteristic actuation trigger for each respective one of the commands mentioned above (and any other commands as well). For example, the configuration mode actuator 270 may be pressed and held for at least a threshold amount of time (e.g., greater than three seconds) to initiate the save command 280. The configuration mode actuator 270 may be pressed with a short press (e.g., a press less than three seconds in duration) in order to initiate the status command 284 to display the saved configuration 280, and the configuration mode actuator 270 may be short pressed again to initiate the retrieve command 282. Alternatively, the status command 284 could be bypassed by simply doing two short presses to directly initiate the retrieve command 282.

Of course, other specific characteristic actuation triggers could be employed for each respective command, and those listed above are merely examples. However, the general principle of allowing a single actuator to be used with different characteristic actuation triggers (e.g., patterns or methods of actuation) will advantageously enable the operator 125 to avoid having to go through a painstaking process of establishing (or re-establishing) settings for dynamic vehicle control functions after each key cycle. Instead, the settings can be saved, recalled and/or reviewed all using the same button or switch, with respective different triggers defined to initiate each command. This operational paradigm minimizes distraction to the operator 125, reduces time and effort, and generally improves satisfaction of the operator 125.

As can be apparent from the description above, the subsystem controllers (i.e., driveline subsystem controller 242, powertrain subsystem controller 252 and chassis subsystem controller 262) may each be capable of taking instruction from respective switches of the user interface 120 for defining settings for dynamic vehicle control functions or from the arbitration and saving module 230. In this regard, whereas individual switches or buttons generally may be used for normal positioning and selection of the settings for the dynamic vehicle control functions, the configuration mode actuator 270 may be used to change any or all of such settings at the respective subsystem controllers. In an example embodiment, this duality of different potential instruction sources may be managed (and arbitrated) by the arbitration and saving module 230. Moreover, as will be noted below, the arbitration and saving module 230 may be configured to interface with the subsystem controllers in such a way that the switch positions (and corresponding signals provided to the subsystem controllers based on the switch positions) remain unchanged even when the saved configuration 180 is implemented.

In this regard, the arbitration and saving module 230 may be configured to monitor the signals present on the vehicle communication bus 165. These signals are encoded to correspond to the settings associated with each respective signal. Thus, the signals are indicative of the current instructions being provided by the driveline subsystem controller 242, powertrain subsystem controller 252 and chassis subsystem controller 262 to the driveline subsystem 240, powertrain subsystem 250 and chassis subsystem 260 to dictate the corresponding settings for the dynamic vehicle control functions. When the save command 280 is received, the arbitration and saving module 230 merely copies all of the corresponding signals currently provided on the vehicle communication bus 165 and stores each respective signal as the saved configuration 180. When the retrieve command 282 is received, the arbitration and saving module 230 provides the copied or "mirrored" signals to the subsystem controllers corresponding to the saved configuration 180 and instructs the subsystem controllers to employ the copied or mirrored signals instead of the signals otherwise provided on the vehicle communication bus 165. When the status command 284 is received, the arbitration and saving module 230 displays (e.g., at the user interface 120) the various states that correspond to the saved configuration 180. However, there is otherwise no impact to (and no change in the instructions sent to) the subsystem controllers when the status command 284 is received.

Figure 3:
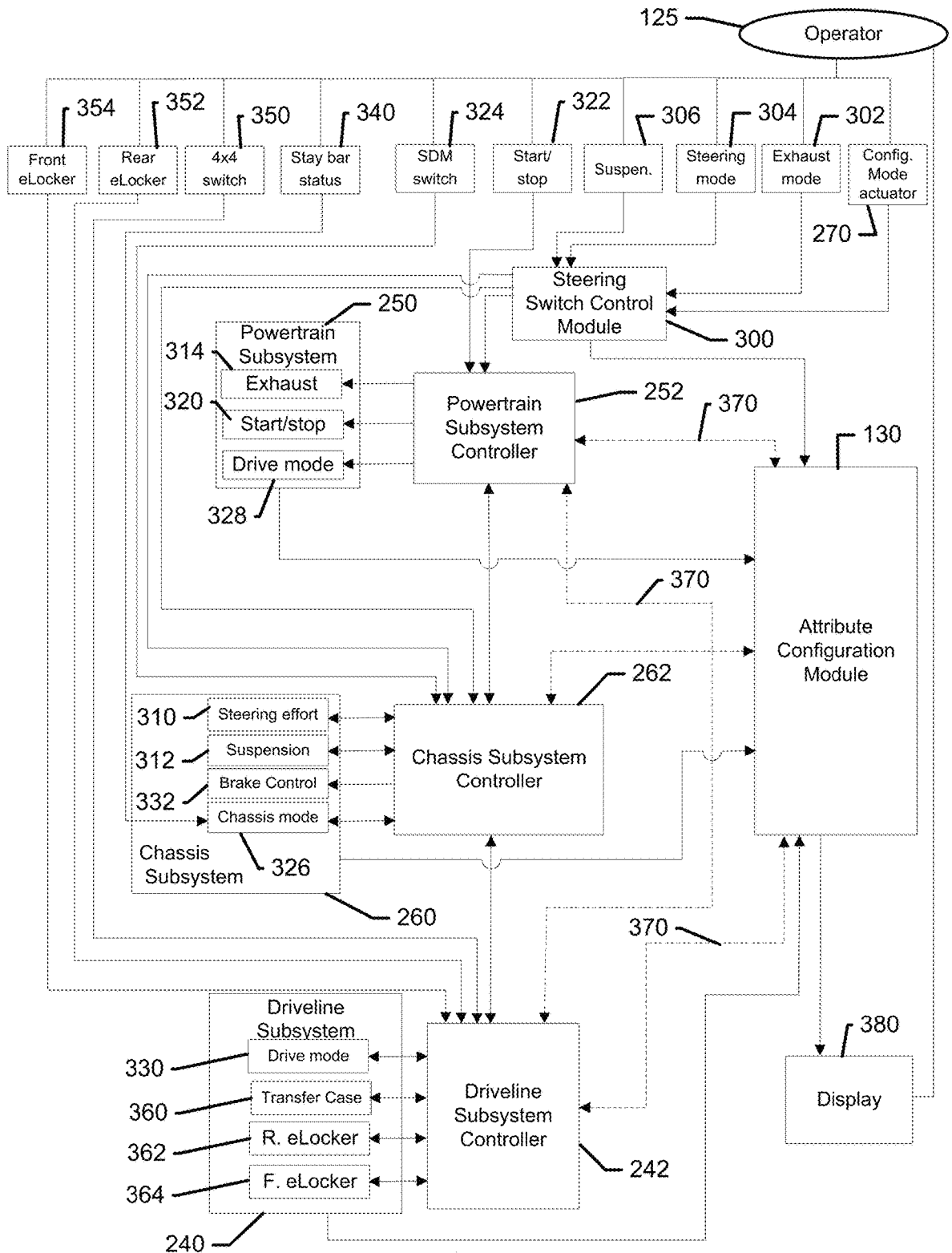
FIG. 3 illustrates a block diagram of various components of the system in greater detail in accordance with an example embodiment.

FIG. 3 illustrates a block diagram of various components of the control system 100 of FIG. 1 in relation to a more detailed view of the components shown in FIG. 2. In this regard, FIG. 3 illustrates how the operator 125 may actuate the configuration mode actuator 270 to interface with the attribute configuration module 130 via a steering switch control module 300 due to the configuration mode actuator 270 being a button or switch on the steering wheel of the vehicle 110 in this example. The steering switch control module 300 interfaces with other switches or buttons that are located on the steering wheel or steering column including an exhaust mode switch 302, a steering mode switch 304 and a suspension mode switch 306. The steering switch control module 300 in turn interfaces also with the chassis subsystem controller 262 for control of steering effort actuators/components 310 and suspension actuators/components 312 of the chassis subsystem 260 for the steering mode switch 204 and suspension mode switch 306, respectively. The steering switch control module 300 also interfaces with the powertrain subsystem controller 252 with respect to exhaust actuators/components 314 of the powertrain subsystem 250 for the exhaust mode switch 302.

In an example embodiment, a start/stop system for fuel economy and corresponding actuators/components 320 of the powertrains subassembly 250 may be controlled by the powertrain subsystem controller 252 responsive to actuation of a start/stop switch 322. Meanwhile, an SDM switch 324 may be provided to define various operational modes (e.g., base powertrain mode, chassis system mode and/or driveline drive mode). The SDM switch 324 may be operably coupled to chassis mode actuators/components 326 of the chassis subsystem 260. Mode information may be shared from the chassis subsystem controller 262 with the powertrain subsystem controller 252 and/or the driveline subsystem controller 242 to correspondingly control base powertrain drive mode actuators/components 328 of the powertrain subsystem 250 and driveline drive mode actuators/components 330 of the driveline subsystem 240, respectively. Chassis mode may also impact brake control actuators/components 332 of the chassis subsystem 260. A stabilizer bar status switch 340 is also operably coupled to the chassis subsystem controller 262.

Other switches that may be part of the user interface 120 of FIGS. 1 and 2 may include a 4×4 switch 350, a rear eLocker switch 352 and a front eLocker switch 354. Each of these switches may be operably coupled to the driveline subsystem controller 242 to control the transfer case 360, and actuators/components associated with a rear electrical differential lock 362 and a front electrical differential lock 364 of the driveline subsystem 240, respectively.

As noted above, the mirror signals may be provided on the vehicle communication bus 165. Thus, communication between the attribute configuration module 130 and each of the subsystem controllers (i.e., the driveline subsystem controller 242, the powertrain subsystem controller 252 and the chassis subsystem controller 262) may occur on the vehicle communication bus (e.g., CAN bus) 165 of FIG. 1. However, it is also possible to provide the mirror signals on a separate communication bus or on internal communication lines 370. The internal communication lines 370 are shown in dashed lines in FIG. 3 in order to distinguish them. In such an example, mirror signals may be communicated on the internal communication lines 370, whereas the other signals that dictate configuration settings are communicated on the vehicle communication bus 165. Various information may also be provided to the operator 125 via display 380, which may be part of the user interface 120.

Each of the subsystem controllers may be configured to, responsive to every key cycle (i.e., on/off cycle of the vehicle 110), initiate operations according to the switch positions for each respective subsystem and components thereof. In this regard, the system may reset to the switch positions every time a new on or run cycle is initiated for the vehicle 110. However, the saved configuration 180 is saved in the attribute configuration module 130 (or more specifically by the arbitration and saving module 230) and the mirror signals are simultaneously communicated to the subsystem controllers based on the saved configuration 180. However, the subsystem controllers may ignore the mirror signals by default. Only the initiation of the retrieve command 284 by actuation of the configuration mode actuator 270 may direct the corresponding subsystem controller(s) to use the mirror signals to determine component/actuator states within the driveline subassembly 240, the powertrain subassembly 250, and the chassis subassembly 260.

In some embodiments, the retrieve command 282 may therefore cause the attribute configuration module 130 to signal to the subsystem controllers to alternate from looking to the vehicle communication bus 165 for encoded signals to define configuration state to looking to the internal communication lines 370 or the vehicle communication bus 165 (dependent upon which paradigm is chosen) the mirror signals as the encoded signals. However, when the retrieve command 282 is issued, there is no actual change to any of the switch positions, and so the switches still define the same status information (i.e., via the encoded signals) that were previously defined. The only differences is that the subsystem controllers take their instruction from the mirror signals instead of signals on the vehicle communication bus 165. Any subsequent changes in positions of any of the switches may be detected by the attribute configuration module 130, and the attribute configuration module 130 may correspondingly direct the respective subsystem controller with which the switch is associated to stop using the mirror signal and revert to the switch signal for the switch that was altered. As such, for example, the mirror signals may always correspond to the saved configuration 180 and may only change when a new saved configuration is generated. However, the mirror signals may generally be ignored by the subsystem controllers unless the retrieve command 282 is issued. Thereafter, any changes to individual switches will override the mirror signals. This ensures that there is no need for continued software updating to add or change content or possible combinations of features. Instead, the normal limitations on content and possible combinations remain unchanged. Accordingly, protective actions associated with ensuring valid combinations are inherent in the system and are not altered by the mirror signals.

Figure 4:
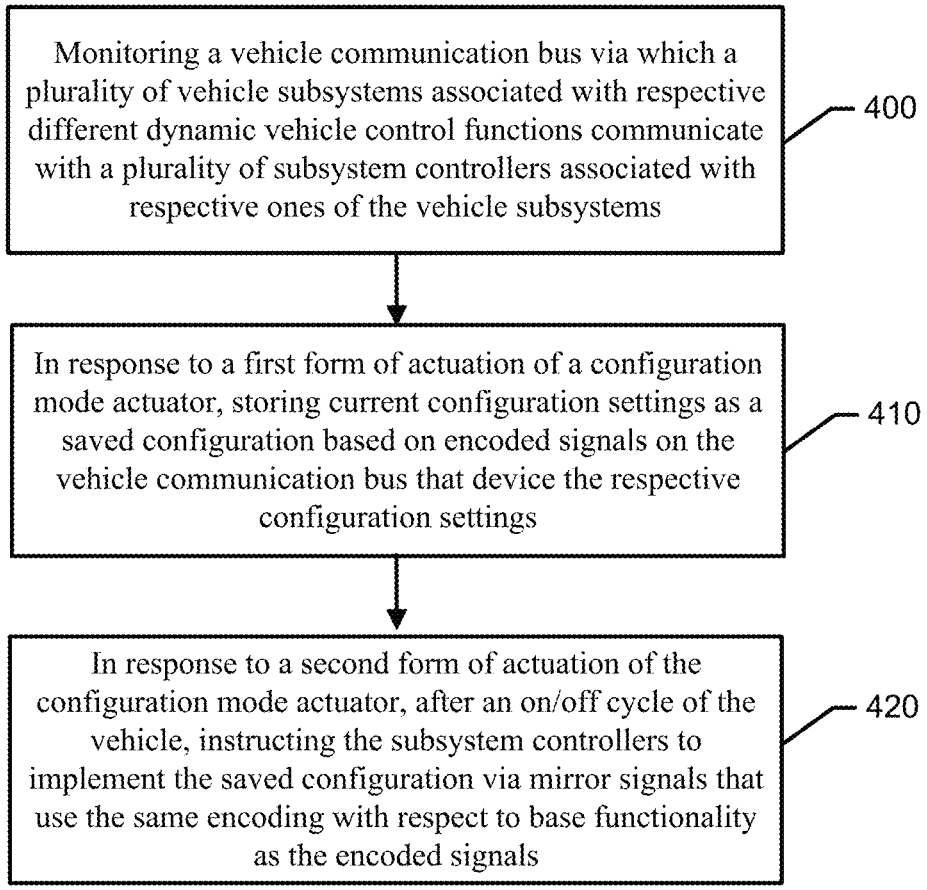
FIG. 4 a method of providing customizable vehicle attribute configuration in accordance with an example embodiment.

FIG. 4 illustrates a block diagram of one example method of providing dynamic customizable vehicle attribute configuration. The method may include monitoring a vehicle communication bus via which a plurality of vehicle subsystems associated with respective different dynamic vehicle control functions communicate with a plurality of subsystem controllers associated with respective ones of the vehicle subsystems at operation 400. The subsystem controllers may be configured to control actuators associated with the respective different dynamic vehicle control functions to change an operational state of components of the vehicle subsystems based on respective configuration settings. The method may further include, in response to a first form of actuation of a configuration mode actuator, storing current configuration settings as a saved configuration based on encoded signals on the vehicle communication bus that device the respective configuration settings at operation 410. The method may further include, in response to a second form of actuation of the configuration mode actuator, after an on/off cycle of the vehicle, instructing the subsystem controllers to implement the saved configuration via mirror signals that use the same encoding with respect to base functionality as the encoded signals at operation 420. In other words, the mirror signals and the encoded signals use the same encoding to define the corresponding functions for each respective encoding.

Example embodiments may therefore also include a vehicle control system, which may include a plurality of vehicle subsystems associated with respective different dynamic vehicle control functions and a plurality of subsystem controllers associated with respective ones of the vehicle subsystems. The subsystem controllers may be configured to control actuators associated with the respective different dynamic vehicle control functions to change an operational state of components of the vehicle subsystems based on respective configuration settings. The system further includes an attribute configuration module operably coupled to the subsystem controllers. The attribute configuration module may include processing circuitry configured to save current configuration settings as a saved configuration responsive to a first actuation of a configuration mode actuator and, after an on/off cycle of the vehicle, instruct the subsystem controllers to implement the saved configuration responsive to a second actuation of the configuration mode actuator.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the system may further include a vehicle communication bus via which the subsystem controllers and the vehicle subsystems communicate, and the attribute configuration module may be configured to monitor communication on the vehicle communication bus to determine the current configuration settings. In an example embodiment, the subsystem controllers may be configured to receive encoded signals via the vehicle communication bus to define the respective configuration settings. The attribute configuration module may be configured to define mirror signals utilizing the same coding as the encoded signals, and the attribute configuration module may be further configured to instruct the subsystem controllers to utilize the encoded signals on the vehicle communication bus or the mirror signals to define the respective configuration settings. In some cases, the vehicle subsystems may include a driveline subsystem, a powertrain subsystem and a chassis subsystem, and the subsystem controllers may include a driveline subsystem controller, a powertrain subsystem controller and a chassis subsystem controller. In an example embodiment, the dynamic vehicle control functions may include powertrain configurable features including status of an engine start/stop system, engine exhaust mode setting, and a base powertrain drive mode. In some cases, the dynamic vehicle control functions may include driveline configurable features including transfer case setting, front and rear electrical differential lock status, and a driveline drive mode. In an example embodiment, the dynamic vehicle control functions may include chassis configurable features including a steering mode, a suspension mode, stabilizer bar connection status, and a chassis system mode. In some cases, the dynamic vehicle control functions may be changeable during motion of the vehicle responsive to the second actuation of the configuration mode actuator. In an example embodiment, the first actuation of the configuration mode actuator may include a press and hold of the configuration mode actuator longer than a predetermined length of time. In some cases, the second actuation of the configuration mode actuator may include two short presses of the configuration mode actuator. In an example embodiment, a short press of the configuration mode actuator may cause a display of the saved configuration. In some cases, during a run cycle of the vehicle, each instance of the second actuation of the configuration mode actuator causes the saved configuration to be updated based on changes to the current configuration settings during the run cycle. In an example embodiment, the saved configuration may be stored through any number of on/off cycles of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A control system for a vehicle, the system comprising:
a plurality of vehicle subsystems associated with respective different dynamic vehicle control functions, the plurality of vehicle subsystems comprising at least two of a driveline subsystem, a powertrain subsystem, and a chassis subsystem;

a plurality of subsystem controllers associated with respective ones of the vehicle subsystems, the subsystem controllers being configured to control subsystem components to change an operational state of the subsystem components of the vehicle subsystems based on configuration settings; and an attribute configuration module operably coupled to the subsystem controllers, the attribute configuration module comprising processing circuitry;

wherein the processing circuitry is configured to:
save current configuration settings indicative of a current operational state of the subsystem components of the at least two of the driveline subsystem, the powertrain subsystem, and the chassis subsystem as a saved configuration responsive to a first actuation event of a configuration mode actuator;

after an on/off cycle of the vehicle, instruct the subsystem controllers to implement the saved configuration responsive to a second actuation event of the configuration mode actuator, the subsystem controllers being configured to implement the saved configuration by instructing the driveline subsystem, the powertrain subsystem, or the chassis subsystem to control the subsystem components to change the operational state of the subsystem components of the driveline subsystem, the powertrain subsystem, or the chassis subsystem in accordance with the saved configuration; and cause the saved configuration to be displayed responsive to a third actuation event of the configuration mode actuator.

2. The system of claim 1, wherein the processing circuitry is configured to detect the third actuation event as a first press of the configuration mode actuator for less than a threshold duration of time.

3. The system of claim 2, wherein the processing circuitry is configured to detect the second actuation event as a second press of the configuration mode actuator, occurring after the first press, for less than the threshold duration of time.

4. The system of claim 2, wherein the processing circuitry is configured to detect the first actuation event as a press and hold of the configuration mode actuator for more than the threshold period of time.

5. The system of claim 1, further comprising a vehicle communication bus via which the subsystem controllers and the vehicle subsystems communicate;
wherein the attribute configuration module is configured to monitor communication on the vehicle communication bus to determine the current configuration settings.

6. The system of claim 5, wherein the subsystem controllers are configured to receive encoded signals via the vehicle communication bus to define the respective configuration settings;
wherein the attribute configuration module is configured to define mirror signals utilizing the same coding as the encoded signals; and
wherein the attribute configuration module is further configured to instruct the subsystem controllers to utilize the encoded signals on the vehicle communication bus or the mirror signals to define the respective configuration settings.

7. The system of claim 1, wherein the processing circuitry is configured to communicate with the plurality of vehicle subsystems in association with respective different dynamic vehicle control functions;
wherein the dynamic vehicle control functions comprise powertrain configurable features including status of an engine start/stop system, engine exhaust mode setting, and a base powertrain drive mode.

8. The system of claim 1, wherein the processing circuitry is configured to communicate with the plurality of vehicle subsystems in association with respective different dynamic vehicle control functions;
wherein the dynamic vehicle control functions comprise driveline configurable features including transfer case setting, front and rear electrical differential lock status, and a driveline drive mode.

9. The system of claim 1, wherein the processing circuitry is configured to communicate with the plurality of vehicle subsystems in association with respective different dynamic vehicle control functions;
wherein the dynamic vehicle control functions comprise chassis configurable features including a steering mode, a suspension mode, stabilizer bar connection status, and a chassis system mode.

10. The system of claim 1, wherein the processing circuitry is configured to communicate with the plurality of vehicle subsystems in association with respective different dynamic vehicle control functions;
wherein the dynamic vehicle control functions are changeable during motion of the vehicle responsive to the second actuation of the configuration mode actuator.

11. The system of claim 1, wherein, during a run cycle of the vehicle, each instance of the second actuation event of the configuration mode actuator causes the saved configuration to be updated based on changes to the current configuration settings during the run cycle.

12. The system of claim 1, wherein the configuration mode actuator is disposed on a steering wheel of the vehicle.

13. A attribute configuration module of a vehicle control system of a vehicle, the attribute configuration module comprising:
processing circuitry configured to communicate with a plurality of vehicle subsystems to control vehicle subsystem components to change an operational state of the subsystem components of the vehicle subsystems based on configuration settings, the plurality of vehicle subsystems comprising at least two of a driveline subsystem, a powertrain subsystem, and a chassis subsystem;
wherein the processing circuitry is further configured to:
save current configuration settings for the subsystem components as a saved configuration responsive to a first actuation event of a configuration mode actuator;
after an on/off cycle of the vehicle, instruct the vehicle subsystems to implement the saved configuration responsive to a second actuation event of the configuration mode actuator by instructing the driveline subsystem, the powertrain subsystem, or the chassis subsystem to control the subsystem components to change the operational state of the subsystem components of the driveline subsystem, the powertrain subsystem, or the chassis subsystem in accordance with the saved configuration, and cause the saved configuration to be displayed responsive to a third actuation event of the configuration mode actuator.

14. The system of claim 13, wherein the processing circuitry is configured to detect the third actuation event as a first press of the configuration mode actuator for less than a threshold duration of time.

15. The system of claim 14, wherein the processing circuitry is configured to detect the second actuation event as a second press of the configuration mode actuator, occurring after the first press, for less than the threshold duration of time.

16. The system of claim 13, wherein the processing circuitry is configured to detect the first actuation event as a press and hold of the configuration mode actuator for more than the threshold period of time.

17. The system of claim 13, wherein the threshold period of time is three seconds.

18. A method of providing customizable vehicle attribute configuration, the method comprising:
communicating with a plurality of vehicle subsystems to control subsystem components to change an operational state of the subsystem components of the vehicle subsystems based on configuration settings, the plurality of vehicle subsystems comprising at least two of a driveline subsystem, a powertrain subsystem, and a chassis subsystem;
saving, by processing circuitry, current configuration settings for the subsystem components as a saved configuration responsive to a first actuation event of a configuration mode actuator;
after an on/off cycle of the vehicle, instructing, by the processing circuitry, the vehicle subsystems to implement the saved configuration responsive to a second actuation event of the configuration mode actuator by instructing the driveline subsystem, the powertrain subsystem, or the chassis subsystem to control the subsystem components to change the operational state of the subsystem components of the driveline subsystem, the powertrain subsystem, or the chassis subsystem in accordance with the saved configuration; and
causing, by the processing circuitry, the saved configuration to be displayed responsive to a third actuation event of the configuration mode actuator.

* * * * *